United States Patent
Kikuchi

(10) Patent No.: US 12,457,386 B2
(45) Date of Patent: Oct. 28, 2025

(54) DISTRIBUTION MANAGEMENT FOR PROVIDING RECOMMENDATION VIDEO IN ACCORDANCE WITH TOPIC BEING VIEWED

(71) Applicant: Rakuten Group, Inc., Tokyo (JP)

(72) Inventor: Ko Kikuchi, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/921,450

(22) PCT Filed: Apr. 13, 2022

(86) PCT No.: PCT/JP2022/017720
§ 371 (c)(1),
(2) Date: Oct. 26, 2022

(87) PCT Pub. No.: WO2023/199434
PCT Pub. Date: Oct. 19, 2023

(65) Prior Publication Data
US 2024/0357209 A1    Oct. 24, 2024

(51) Int. Cl.
*H04N 21/482* (2011.01)
*H04N 21/44* (2011.01)
*H04N 21/466* (2011.01)

(52) U.S. Cl.
CPC ... *H04N 21/4826* (2013.01); *H04N 21/44008* (2013.01); *H04N 21/4668* (2013.01)

(58) Field of Classification Search
CPC ......... H04N 21/4826; H04N 21/44008; H04N 21/4668; H04N 21/84; H04N 21/47815; H04N 21/23418; H04N 21/812; H04N 21/26603; H04N 21/4722; H04N 21/4828; H04N 21/8405
USPC ........................................................... 725/44
See application file for complete search history.

(56) References Cited

U.S. PATENT DOCUMENTS

| | | | |
|---|---|---|---|
| 8,959,553 B1 * | 2/2015 | Pan ..................... | H04N 21/4312 725/47 |
| 9,635,400 B1 * | 4/2017 | Sherrets ............. | H04N 21/8352 |
| 9,639,634 B1 * | 5/2017 | Greene .............. | H04N 21/4532 |
| 2003/0009759 A1 * | 1/2003 | Khoo ................ | H04N 21/25891 348/E7.071 |
| 2006/0075346 A1 * | 4/2006 | Lanning ................. | H04N 21/84 386/E5.064 |

(Continued)

FOREIGN PATENT DOCUMENTS

| JP | 2008-054048 A | 3/2008 |
|---|---|---|
| JP | 2008-125022 A | 5/2008 |

(Continued)

OTHER PUBLICATIONS

International Search Report for PCT/JP2022/017720 dated, Jul. 5, 2022 (PCT/ISA/210).

*Primary Examiner* — Cynthia M Fogg
(74) *Attorney, Agent, or Firm* — Sughrue Mion, PLLC

(57) ABSTRACT

A distribution management system (101) plays, on a screen, a video (A) in which a plurality of topics (a1, a2, . . . ) is sequentially covered, determines a topic (a1) currently being covered on the screen on which the video (A) is being played, identifies a list (L1) of recommendation videos (X1) in which a topic related to the determined topic (a1) is covered, and provides the identified list (L1) via the screen.

16 Claims, 12 Drawing Sheets

(56) References Cited

U.S. PATENT DOCUMENTS

| | | | | |
|---|---|---|---|---|
| 2008/0140532 | A1* | 6/2008 | Johnson | H04N 21/4185 |
| | | | | 705/26.1 |
| 2008/0148179 | A1* | 6/2008 | Sloo | H04N 21/4314 |
| | | | | 715/792 |
| 2008/0240681 | A1* | 10/2008 | Fukushima | H04N 21/84 |
| | | | | 348/E5.007 |
| 2010/0070523 | A1* | 3/2010 | Delgo | G06F 16/743 |
| | | | | 707/769 |
| 2010/0162312 | A1* | 6/2010 | Heilbron | H04N 21/25883 |
| | | | | 707/706 |
| 2014/0016822 | A1 | 1/2014 | Sakamoto | |
| 2014/0359644 | A1* | 12/2014 | Kumar | H04N 21/23418 |
| | | | | 725/60 |
| 2015/0046817 | A1* | 2/2015 | Cudak | H04N 21/8549 |
| | | | | 715/719 |
| 2016/0205442 | A1* | 7/2016 | Yee | H04N 21/47815 |
| | | | | 725/34 |
| 2018/0025405 | A1* | 1/2018 | Jones | G06V 20/46 |
| | | | | 705/26.7 |
| 2018/0070150 | A1* | 3/2018 | Lentzitzky | H04N 21/8456 |
| 2018/0152764 | A1* | 5/2018 | Taylor | G06Q 30/0623 |
| 2018/0285897 | A1* | 10/2018 | Seo | H04N 21/47815 |
| 2019/0080175 | A1* | 3/2019 | Buratti | G06V 10/235 |
| 2019/0289359 | A1* | 9/2019 | Sekar | H04N 21/4333 |
| 2023/0300416 | A1* | 9/2023 | Panchaksharaiah | ........ |
| | | | | H04N 21/26258 |
| | | | | 725/46 |

FOREIGN PATENT DOCUMENTS

| | | |
|---|---|---|
| JP | 2014-016882 A | 1/2014 |
| JP | 2016-025570 A | 2/2016 |
| JP | 2016-086342 A | 5/2016 |
| JP | 2018-026152 A | 2/2018 |
| JP | 2019-146142 A | 8/2019 |

* cited by examiner

FIG. 5

| PRODUCT (TOPIC) | FRAME |
|---|---|
| NONE (INTRODUCTION) | 00:00 to 08:24 |
| CRYSTAL MASK | 08:25 to 10:46 |
| PLASMA AIR PURIFIER | 10:47 to 11:17 |
| NONE (BREAK) | 11:18 to 12:01 |
| NON-CONTACT THERMOMETER | 12:02 to 14.54 |
| ALCOHOL DISINFECTANT SHEET | 14:55 to 16:54 |
| HYPOCHLOROUS ACID DISINFECTANT | 16:55 to 17:12 |

| PRODUCT (TOPIC) | FRAME | RECOMMENDATION LIST TL' |
|---|---|---|
| NONE (INTRODUCTION) | 00:00 to 08:24 | L0 |
| CRYSTAL MASK | 08:25 to 10:46 | L1 |
| PLASMA AIR PURIFIER | 10:47 to 11:17 | L2 |
| NONE (BREAK) | 11:18 to 12:01 | L0 |
| NON-CONTACT THERMOMETER | 12:02 to 14.54 | L3 |
| ALCOHOL DISINFECTANT SHEET | 14:55 to 16:54 | L4 |
| HYPOCHLOROUS ACID DISINFECTANT | 16:55 to 17:12 | L5 |

DISTRIBUTION MANAGEMENT FOR PROVIDING RECOMMENDATION VIDEO IN ACCORDANCE WITH TOPIC BEING VIEWED

CROSS REFERENCE TO RELATED APPLICATIONS

This application is a National Stage of International Application No. National Stage Entry of PCT/JP2022/017720 filed Apr. 13, 2022.

TECHNICAL FIELD

The present disclosure relates to distribution management for providing recommendation videos in accordance with a topic being viewed.

BACKGROUND ART

With changes in lifestyles, a mode of sales for products or goods and services known as live streaming commerce has gathered attention. In live streaming commerce, a streamer streams a video presenting a specific product or the like, and a viewer that views the stream can purchase that product or the like online, leave a comment, or the like to support purchase and sale in live streaming commerce.

For example, Patent Literature 1 describes a system in which a streaming user presents a specific product online. The system awards, in accordance with a purchase performance of the presented product, an incentive to the streaming user and the viewing user that purchases the product.

CITATION LIST

Patent Literature

Patent Literature 1: Unexamined Japanese Patent Application Publication No. 2018-26152

SUMMARY OF INVENTION

Technical Problem

However, live streaming commerce differs from traditional face-to-face commerce in that the viewer cannot touch, see, or confirm the product directly. Consequently, the viewer may desire more information, such as comments, reviews, and the like about the product. As such, in live streaming commerce, there is demand for a system whereby a viewer can easily and quickly obtain information about a product or the like that the viewer is considering purchasing.

The present disclosure is made with the view of the above situation, and an objective of the present disclosure is to provide distribution management whereby a viewer can easily and quickly obtain desired information.

Solution to Problem

A distribution management system according to a first aspect of the present disclosure includes:
one or more processors, wherein
processing for
  playing, on a screen, a video in which a plurality of topics is sequentially covered,
  determining a topic currently being covered on the screen on which the video is being played,
  identifying a list of recommendation videos in which a topic related to the determined topic is covered, and
  providing the identified list via the screen,
is executed by at least one of the one or more processors.

A distribution management method according to a second aspect of the present disclosure includes:
  playing, by a computer and on a screen, a video in which a plurality of topics is sequentially covered;
  determining, by the computer, a topic currently being covered on the screen on which the video is being played;
  identifying, by the computer, a list of recommendation videos in which a topic related to the determined topic is covered; and
  providing, by the computer, the identified list via the screen.

A non-transitory recording medium according to a third aspect of the present disclosure stores a program for causing a computer to execute:
  playing, on a screen, a video in which a plurality of topics is sequentially covered;
  determining a topic currently being covered on the screen on which the video is being played,
  identifying a list of recommendation videos in which a topic related to the determined topic is covered; and
  providing the identified list via the screen.

Advantageous Effects of Invention

According to the present disclosure, a viewer can easily and quickly obtain desired information.

BRIEF DESCRIPTION OF DRAWINGS

FIG. 5 is an explanatory drawing illustrating an example of a topic list of Embodiment 1;

FIG. 11 is an explanatory drawing illustrating an example of a topic list of Embodiment 2.

DESCRIPTION OF EMBODIMENTS

Embodiment 1

Figure 1:
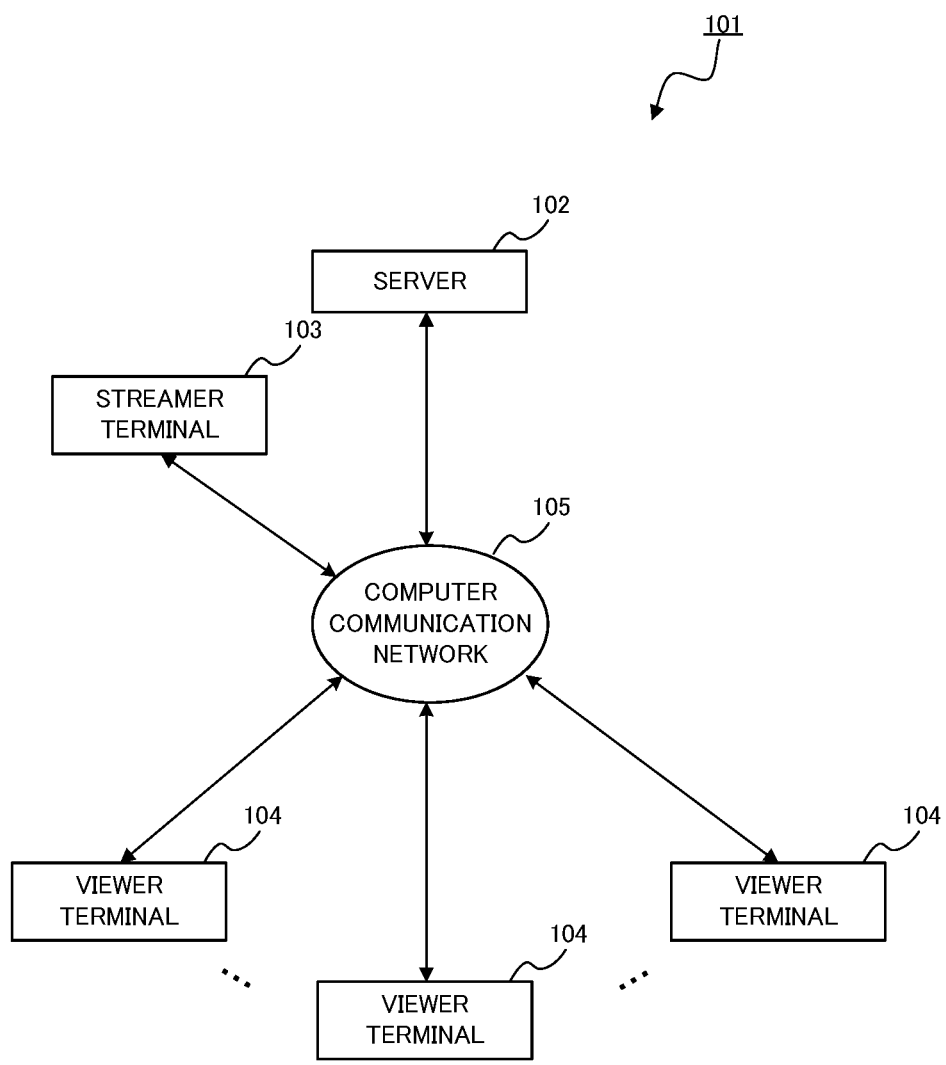
FIG. 1 is an explanatory drawing illustrating the cooperation between devices that realize a distribution management system.

Hereinafter, Embodiment 1 of the present disclosure is described. Note that the following embodiments are presented for the purpose of explanation and should not be construed as limiting the scope of the invention of the present disclosure. Therefore, embodiments in which some elements or all elements of these embodiments are replaced with equivalent elements by one skilled in the art can also be employed, and such embodiments are also included within the scope of the present disclosure.

Relationship Between Terminal and Server, and Program

A distribution management system according to the present embodiment is for managing videos that a streamer or a distributor distributes and for providing the videos to viewers. With the distribution management system according to the present embodiment, one or a plurality of servers cooperates with smartphones, tablet computers, personal computers, or other terminals to manage videos that a streamer distributes and provide the videos to viewers.

Typically, the servers and the terminals of the present embodiment are realized by causing computers to execute programs, but the servers and the terminals can also be realized by dedicated electronic circuits executing processes.

In addition, as an intermediate form between a computer and a dedicated electronic circuit, the servers and the terminals of the present embodiment can be configured by compiling a program in the design script of an electronic circuit and applying a field programmable gate array (FPGA) or similar technology that dynamically configures the electronic circuit on the basis of that design script.

The servers according to the present embodiment are realized by one or a plurality of server computers executing various functions that are realized by one or a plurality of server programs. The one or plurality of server computers communicate with terminals that receive commands such as access to a video distribution site provided by the server.

The terminals according to the present embodiment are terminal computers that realize smartphones or the like, and can be realized by executing terminal programs provided from a business or an administrator via a distribution server or the like.

Examples of terminal programs that can be used include those corresponding to so-called "apps."

In addition, a general browser can be used as the terminal program, or a script program that runs on a browser can be used as the terminal program.

In these cases, the app or the browser operating on the terminal computers serves as an interface for providing a video distribution management service to a user by communicating with a server of the distribution management system that functions as an app server or a web server.

Typically, the programs executed by the server computers or the terminal computers can be recorded on a non-transitory computer-readable information recording medium such as a compact disk, a flexible disk, a hard disk, a magneto-optical disk, a digital video disk, a magnetic tape, read-only memory (ROM), electrically erasable programmable ROM (EEPROM), flash memory, and semiconductor memory. This non-transitory information recording medium can be distributed/sold separate from the server computers and the terminal computers.

In the server computers and the terminal computers, a program stored on the non-transitory information recording medium such as a flash memory, a hard disk, or the like is read out to random access memory (RAM) that is a temporary storage device and, then, commands included in the read-out program are executed by a central processing unit (CPU). However, in architectures in which the ROM and the RAM can be mapped to a single memory space and execution is possible, the stipulations in the programs stored in the ROM are read out and executed directly by the CPU.

Furthermore, the server program and the terminal program can be distributed/sold to the server computers, the terminal computers, or the like from a distribution server or the like managed by the business, via a transitory transmission medium such as a computer communication network, separate from the computer on which the program is to be executed.

Note that, when the server that provides the video distribution management service is configured from a plurality of computers, the programs running on the various computers are a plurality of mutually different server programs that cooperate with each other while having or including mutually different functions. As such, the combination of this plurality of programs can be regarded as a system program for realizing the distribution management system.

In the following, the distribution management system of the present embodiment provides a video distribution service used in so-called live streaming commerce, for example. The video distribution service provided by the distribution management system is used by streamers and viewers of videos. The viewers view videos distributed by video on demand (VOD) and/or videos live streamed by the streamer. VOD distribution is defined as distributing, to a viewer, a video live streamed in the past by the streamer or distributing a video that has not been live streamed, but is simply recorded. Live streaming is defined as distributing, in real time to a viewer, a video that the streamer is streaming.

Background of Conception of Distribution Management System of the Present Embodiment Conventionally, when there is a topic of interest (for example, a product or goods or the like to be presented) to a viewer when that viewer is collecting information on a video distribution site, the viewer frequently leaves the video distribution site and moves to a review site or a site that provides an online sales service to collect information. As such, it is thought that providing a recommended video (a recommendation video) to the viewer to prevent the viewer from leaving the video distribution site would be effective. It is thought that this recommendation video would be identified on the basis of a topic included in a video currently being viewed, for example.

However, when a plurality of topics are covered in a video being viewed, it is thought that a video that covers a topic related to a topic that differs from the topic currently being viewed may be provided as the recommendation video. In such a case, there is a concern that the viewer will not be interested in the recommendation video and eventually leave the video distribution site.

Additionally, even if the viewer plays the provided recommendation video, when a plurality of topics are covered in the recommendation video, time may be required until the topic of interest to the viewer is covered, and there is a concern that the viewer may leave the site anyway.

In light of this situation, the present inventor studied technologies for keeping viewers longer on video distribution sites and, as a result, conceived of the distribution management system of the present embodiment described below.

Overall Configuration

FIG. 1 is an explanatory drawing illustrating the cooperation between the devices that realize the distribution management system. In a distribution management system 101 illustrated in FIG. 1, a server 102, a streamer terminal 103, and viewer terminals 104 are communicably connected to each other via a computer communication network 105 such as the internet or the like. Hereinafter, the distribution management system 101 is described while referencing FIG. 1.

The server 102 provides a video distribution site. The server 102 manages a video distributed from the streamer terminal 103, and distributes the video in accordance with requests from the viewer terminals 104.

The streamer terminal 103 distributes videos, which a user that is the streamer of the video has captured, edited, and the like, to the viewer terminals 104 via the server 102. The streamer terminal 103 provides an action on the video from the viewers. Examples of the action from the viewers include a comment that is input at a specific frame of the video, evaluations such as so-called "likes", and the like.

In accordance with a request from a user that is a viewer, the viewer terminal 104 acquires, from the server 102, the video distributed from the streamer terminal 103 and plays the acquired video. The viewer terminal 104 receives, from the user that is a viewer, the action on the video being distributed.

Sending/Receiving of Data Between Server and Viewer Terminal

In a video A to be distributed in the present embodiment, a plurality of topics a1, a2, . . . are sequentially covered. When the video distribution service provided by the distribution management system 101 of the present embodiment is, for example, used in live streaming commerce, a plurality of topics a1, a2, . . . that are products or goods or services are sequentially covered in the video A to be distributed.

The server 102 cooperates with the viewer terminal 104 to determine the topics a1, a2, . . . currently being covered on a screen being played on the viewer terminal 104. Specifically, when being used for live streaming commerce, the server 102 cooperates with the viewer terminal 104 to determine which product or the like a1, a2, . . . the frame currently being played is presenting.

Moreover, the server 102 cooperates with the viewer terminal 104 to identify a list (recommendation list) L1 of recommendation videos X1, Y1, Z1, . . . in which topics related to the topic (for example, the topic a1) determined as currently being covered are covered, and provides the list L1 via the screen on the viewer terminal 104. Specifically, when being used for live streaming commerce, the server 102 cooperates with the viewer terminal 104 to provide, as the recommendation list L1 to the viewer, a plurality of other videos X1, Y1, Z1, . . . that present products or the like that are the same or similar, or identical or similar to the product or the like a1 currently being presented in the video. The provided recommendation list L1 is displayed on the screen of the viewer terminal 104 together with thumbnail images of the recommendation videos X1, Y1, Z1, . . . included in that list.

A plurality of recommendation videos Xn, Yn, Zn, . . . are identified for one topic an included in the video being distributed, and a recommendation list Ln thereof is provided to the viewer. Specifically, when the plurality of topics a1, a2, . . . are being covered in the video being distributed, a plurality of recommendation lists Ln are identified, and the recommendation list Ln displayed on the viewer terminal 104 changes every time the topic an to be played changes.

Note that the server 102 may be configured to carry out processing for sending and playing the video A in accordance with a request of the viewer terminal 104. Additionally, the server 102 may be configured to carry out processing for providing the identified recommendation list Ln to the viewer terminal 104.

Figure 2:
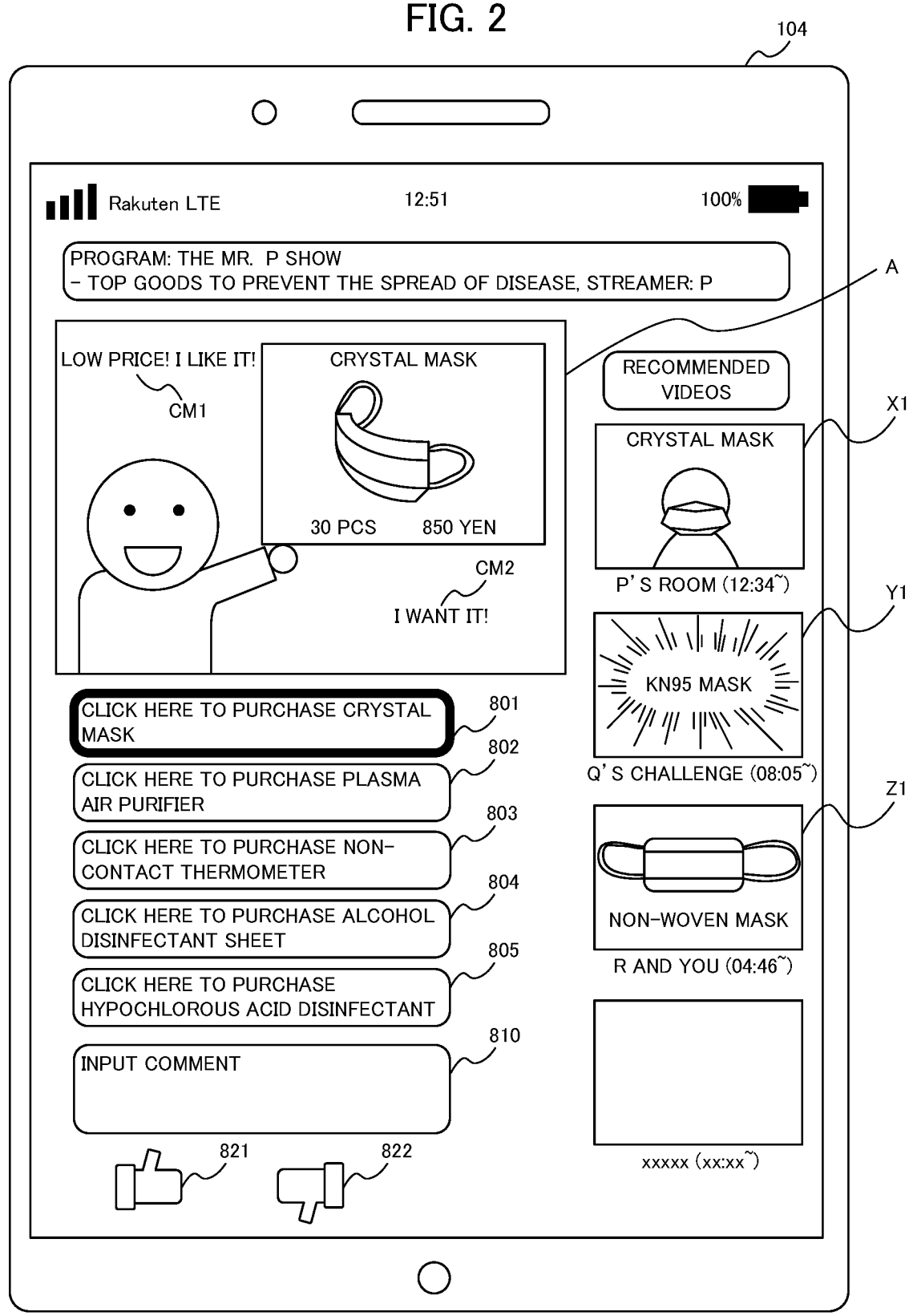
FIG. 2 is an explanatory drawing illustrating an example of a screen during video streaming.

FIG. 2 is an explanatory drawing illustrating an example of a screen on which the distributed video A is being played on the viewer terminal 104 that is a tablet terminal. The video A being played in FIG. 2 is a program called "The Mr. P Show—Top Goods to Prevent the Spread of Disease", and is distributed by a streamer P. In the video A, products that are goods for preventing the spread of disease, namely a "crystal mask", a "plasma air purifier", a "non-contact thermometer", an "alcohol disinfectant sheet", and a "hypochlorous acid disinfectant" are presented as the topics a1, a2, . . . .

The topic currently being played is about the product "crystal mask." A recommendation video X1 presenting a product "crystal mask" that is the same as the product "crystal mask", a recommendation video Y1 presenting a product "KN95 mask" that is the same as the product "crystal mask", a recommendation video Z1 presenting a product "non-woven mask" that is similar to the product "crystal mask", and the like are displayed as "recommended videos" on a right side of the screen.

When the topic changes and transitions to the topic of the product "plasma air purifier", recommendation videos that cover products that are the same as or similar to the product "plasma air purifier" are displayed as the "recommended videos."

Note that the distributed video (for example, the video A) may include a portion without a topic. For example, an introduction of the video A may be included before presenting the plurality of products or the like a1, a2, . . . , or a break between the presentation of one product or the like (for example, the product or the like a1) and the presentation of the next product or the like (for example, the product or the like a2) may be included.

A configuration is possible in which a recommendation list L0 of recommendation videos X0, Y0, Z0, . . . related to the video A itself are displayed while an introduction or a break is being played. In one example, another video A that the streamer of the video A is distributing, a video that covers a theme that is the same or similar to the theme covered by the video, and the like are displayed on the screen of the viewer terminal 104 as the recommendation list L0.

Note that the video (for example, the video A) can be realized by video elements, and the thumbnail images of the recommendation videos (the recommendation video Xn and the like) can be realized by poster attributes of the video elements in hypertext markup language (HTML), other graphical user interface (GUI) elements, and the like.

Figure 3:
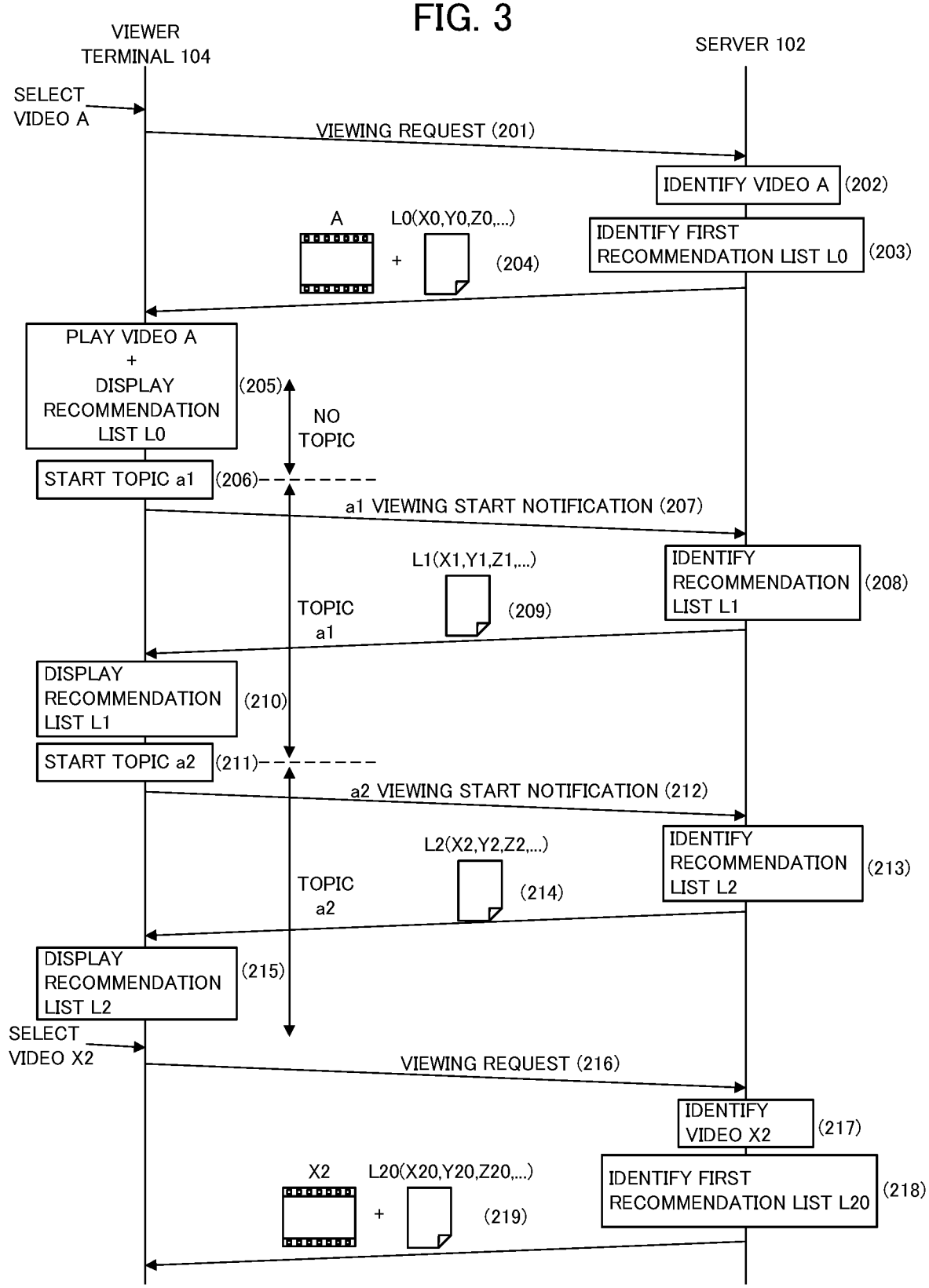
FIG. 3 is a session diagram illustrating an exchange between a server and a viewer terminal of the distribution management system, in Embodiment 1.

FIG. 3 is a session diagram illustrating an exchange in the distribution management system 101 that is carried out when the viewer selects and changes the video to be viewed. In the following, the exchange that is carried out when the viewer selects and changes the video to be viewed is described while referencing FIG. 3. In Embodiment 1, every time the topic an being played on the viewer terminal 104 changes, the server 102 identifies the recommendation list Ln corresponding to the new topic an, and provides the identified recommendation list Ln to the viewer terminal 104.

Firstly, when the video A is selected on the viewer terminal 104, the viewer terminal 104 sends, to the server 102, a viewing request in which the video A is specified (201).

When the server 102 receives the viewing request from the viewer terminal 104, the server 102 identifies the video A (202). Then, the server 102 identifies a first recommendation list L0 of the video A (203). This first recommendation list L0 may be a recommendation list of the video A itself, and need not be the recommendation list Ln of the videos Xn, Yn, Zn, . . . related to the topic an included in the video A.

When the server 102 identifies the video A and the first recommendation list L0, the server 102 sends the identified video A and the first recommendation list L0 to the viewer terminal 104 (204).

When the viewer terminal 104 receives the video A and the first recommendation list L0 from the server 102, the viewer terminal 104 plays the video A and displays the first recommendation list L0 (205). When the frames of the video A advance and the topic a1 starts (206), the viewer terminal 104 sends, to the server 102, an a1 viewing start notification notifying that viewing of the topic a1 has started (207).

When the server 102 receives the a1 viewing start notification from the viewer terminal 104, the server 102 identifies the recommendation list L1 of the recommendation videos X1, Y1, Z1, . . . in which topics related to the topic a1 are covered (208). Then, the server 102 sends the identified recommendation list L1 to the viewer terminal 104 (209).

When the viewer terminal 104 receives the recommendation list L1 from the server 102, the viewer terminal 104 displays the recommendation list L1 (210). When the frames of the video A advance and the topic a2 starts (211), the viewer terminal 104 sends, to the server 102, an a2 viewing start notification notifying that viewing of the topic a2 has started (212).

When the server 102 receives the a2 viewing start notification from the viewer terminal 104, the server 102 identifies the recommendation list L2 of the recommendation videos X2, Y2, Z2, . . . in which topics related to the topic a2 are covered (213). Then, the server 102 sends the identified recommendation list L2 to the viewer terminal 104 (214).

When the viewer terminal 104 receives the recommendation list L2 from the server 102, the viewer terminal 104 displays the recommendation list L2 (215).

Here, when the recommendation video X2 included in the recommendation list L2 is selected while the video A is being played on the viewer terminal 104, the viewer terminal 104 sends, to the server 102, a viewing request in which the recommendation video X2 is specified (216).

Then, when the server 102 receives the viewing request from the viewer terminal 104, the server 102 identifies the recommendation video X2 (217) and identifies a first recommendation list L20 of the recommendation video X2 (218). The server 102 sends, to the viewer terminal 104, the identified recommendation video X2 and the first recommendation list L20 (219). The processing continues in the manner described above.

Terminal Processing and Server Processing

Figure 4:
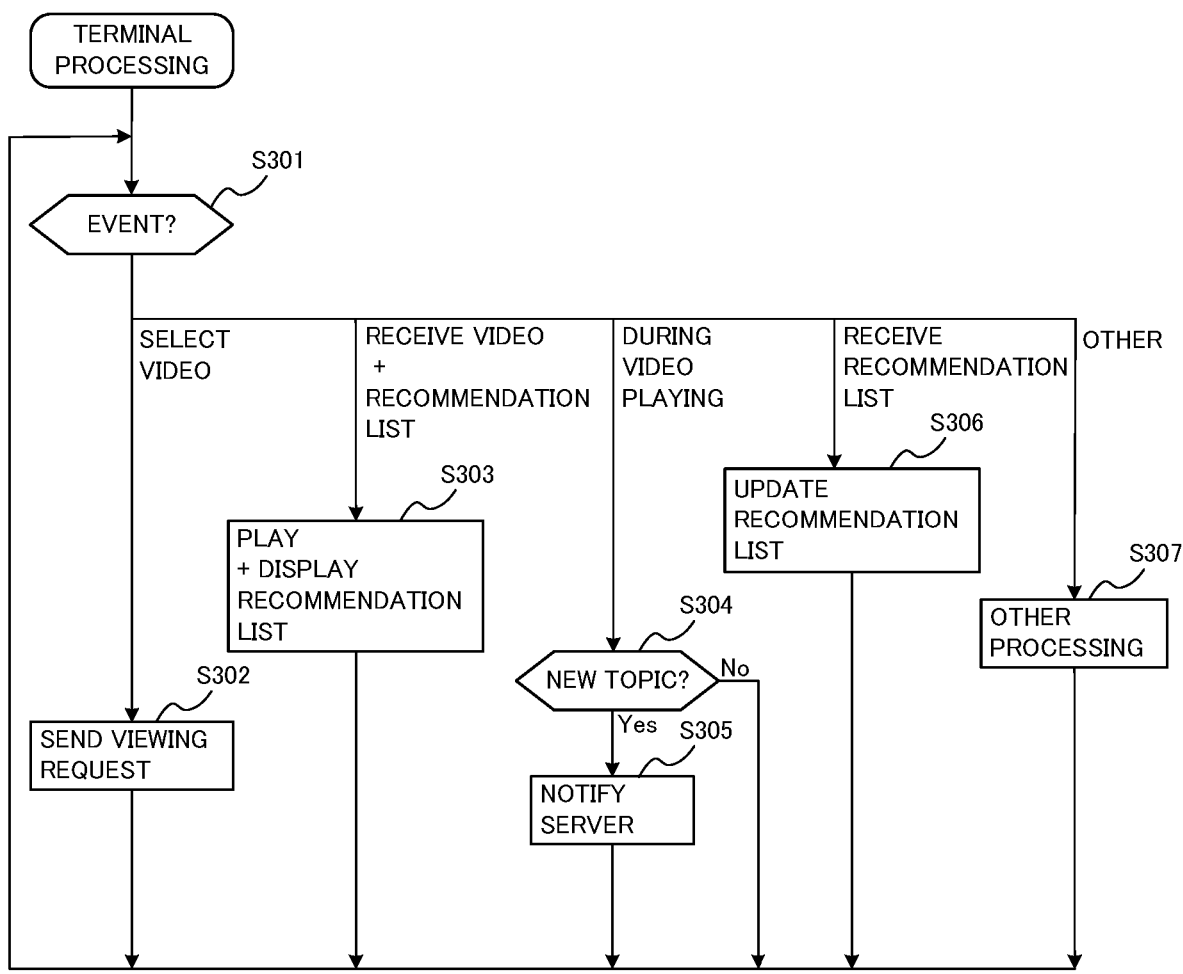
FIG. 4 is a flowchart illustrating the flow of control of terminal processing executed by the viewer terminal of the distribution management system, in Embodiment 1.

FIG. 4 is a flowchart explaining the flow of terminal processing executed in the viewer terminal 104 in the present embodiment. Hereinafter, the terminal processing is described while referencing FIG. 4.

In one example, the viewer terminal 104 starts the terminal processing when a live streaming commerce video app such as illustrated in FIG. 2 is started up or a video site is accessed.

In FIG. 4, when the terminal processing starts, the viewer terminal 104 assumes a stand-by state until an event occurs (step S301).

Firstly, when the viewer terminal 104 receives a selection operation of a video from the user, the viewer terminal 104 sends, to the server 102, a viewing request in which the video is specified (step S302). At this time, when the user selects a recommendation video included in the recommendation list described later, a video start position associated with that recommendation list may be specified and the viewing request may be sent. Then, the processing of step S301 is executed.

Next, when the viewer terminal 104 receives the video specified in the viewing request and the first recommendation list of that video from the server 102, playing of the received video is started and the first recommendation list is displayed (step S303). The viewer terminal 104 may be configured to, at this time, identify information needed to stream/play the video. Specifically, the viewer terminal 104 plays the video after storing a portion of the video in buffer memory. When the video data stored in the buffer memory has decreased, the viewer terminal 104 acquires video data from the server 102 and stores, in the buffer memory, a portion of the remaining video that has not been played while playing the video.

When a video start position is specified in the received video, the viewer terminal 104 may be configured to play the video from that video start position.

Additionally, a configuration is possible in which, when, in step S302, the viewer terminal 104 specifies a video play position associated with a recommendation video and sends a viewing request for the recommendation video, the viewer terminal 104 plays that recommendation video from the video start position.

A configuration is possible in which, when the video and the recommendation list are received from the server 102, a topic list TL that is described later is also received. As illustrated in FIG. 5, the topics included in that video, and the frames that the topics occupy are associated in the topic list TL.

When the viewer terminal 104 starts the playing of the received video and the recommendation list is displayed, the processing of step S301 is executed.

Next, when the viewer terminal 104 determines that the video is playing, the viewer terminal 104 determines whether that video has switched to a new topic (step S304). For example, the viewer terminal 104 determines whether the video has switched to a new topic every time a counter indicating the video play position turns.

When the viewer terminal 104 determines that the video has switched to a new topic (step S304; Yes), the viewer terminal 104 sends a viewing start notification of the new topic to the server 102 (step S305). The viewer terminal 104 may reference the topic list TL received when receiving the video and the recommendation list from the server 102 to determine, on the basis of the current play position, whether the video has switched to a new topic.

Here, the switching to a new topic may be switching at a given timing when the video has advanced, or may be switching by the user that is a viewer manually changing the play position of the video to the play position of a new topic. Thereafter, the processing of step S301 is executed.

Meanwhile, when the viewer terminal 104 determines that a new topic has not been started in the video (step S304; No), the processing of step S301 is executed without modification.

Next, when the viewer terminal 104 receives a new recommendation list from the server 102, the viewer terminal 104 updates the recommendation list and displays new recommended videos (step S306).

Figure 6:
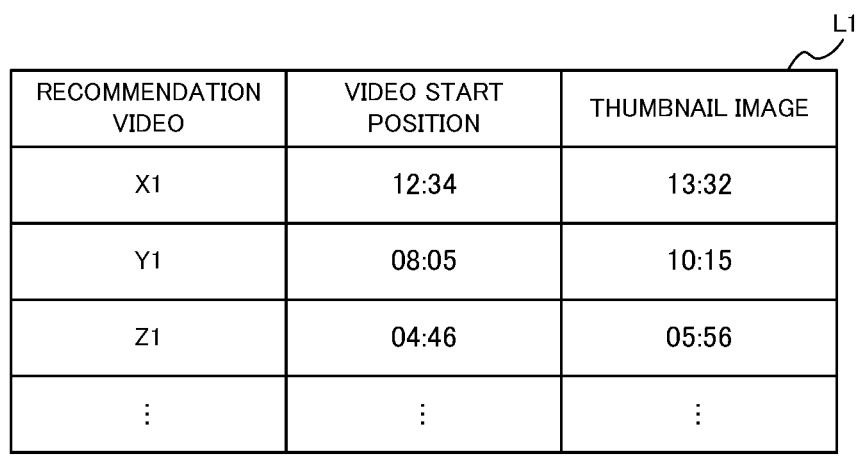
FIG. 6 is an explanatory drawing illustrating an example of a recommendation list.

As described later, as illustrated in the example of FIG. 6, the recommendation video, the video start position thereof, and a thumbnail image may be associated in the received recommendation list.

Moreover, the viewer terminal 104 may be configured to display, in the recommended videos, the thumbnail images associated with the recommendation videos.

When the viewer terminal 104 updates the recommendation list, the processing of step S301 is executed.

Then, when another event occurs, the viewer terminal 104 executes other processing corresponding to the event that has occurred (step S307).

For example, in the screen illustrated in the example of FIG. 2, purchase link buttons 801 to 805, a comment input field 810, a good evaluation button 821, and a poor evaluation button 822 are displayed below the video A.

The purchase link buttons 801 to 805 are link buttons that are respectively associated with the topics sequentially covered in the video A. In the example illustrated in FIG. 2, the product "crystal mask", the product "plasma air purifier", the product "non-contact thermometer", the product "alcohol disinfectant sheet", and the product "hypochlorous acid disinfectant" are presented in the video A, and links to purchase pages for purchasing each of the products are embedded in the purchase link buttons 801 to 805. The purchase link button corresponding to the topic currently being played may be displayed in a highlighted manner. For example, in the example illustrated in FIG. 2, the presentation of the product "crystal mask" is being played in the video A and, as such, the purchase link button 801 for the product "crystal mask" is highlighted.

The comment input field 810 is an input field in which a comment, made by the user that is a viewer, about the video currently being played is received.

The good evaluation button 821 and the poor evaluation button 822 are buttons whereby an evaluation, from the user that is a viewer, of the video currently being played is accepted.

Note that, the purchase link buttons 801 to 805 can be realized by send elements, link elements in HTML or the like, the comment input field 810 can be realized by an input field element in HTML or the like, and the good evaluation button 821 and the poor evaluation button 822 can be realized by send elements in HTML or the like.

Figure 7:
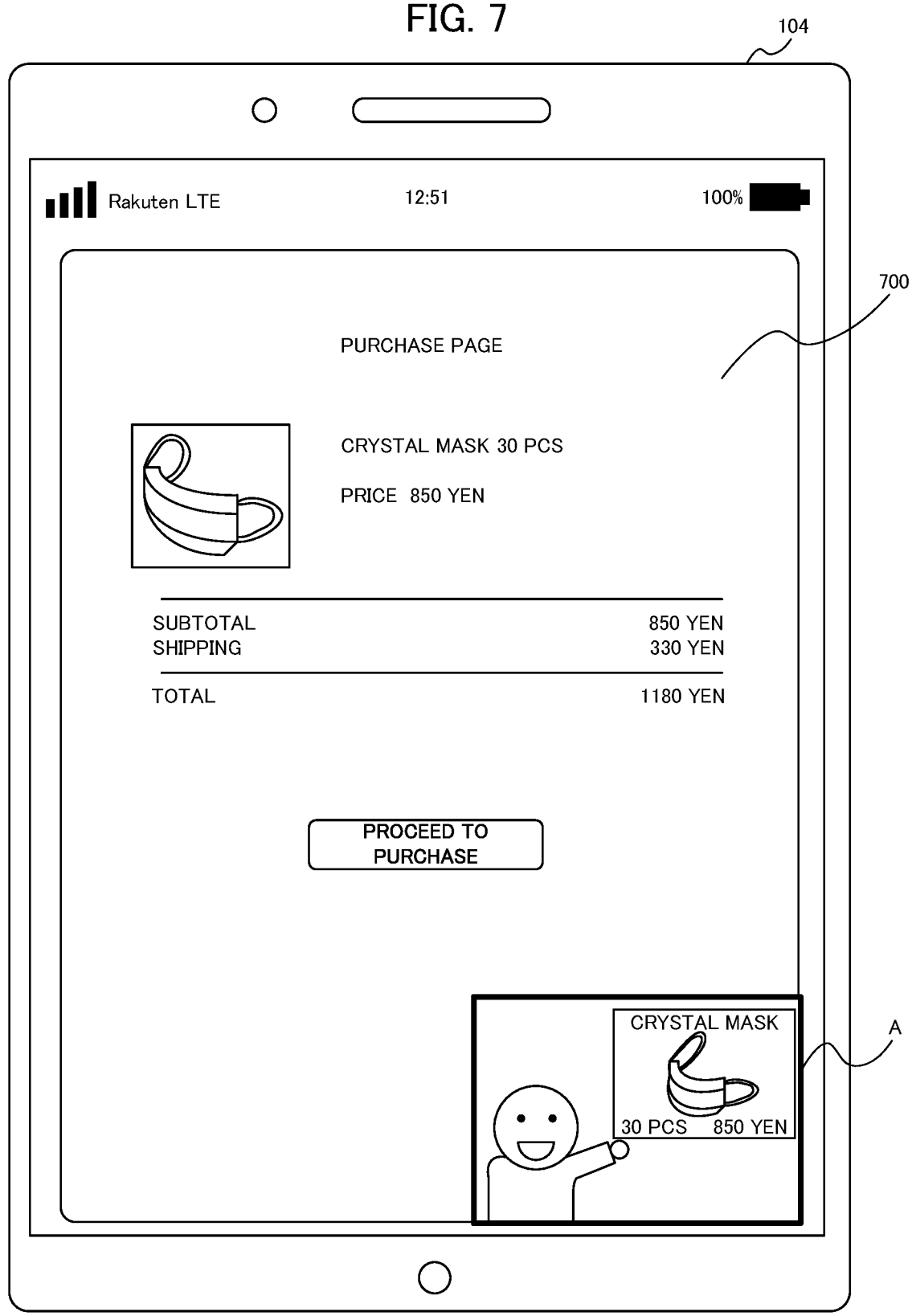
FIG. 7 is an explanatory drawing illustrating an example of a screen of a purchase page.

Returning to FIG. 4, a configuration is possible in which, when, for example, the user that is a viewer selects one of the purchase link buttons 801 to 805, in step S307, the viewer terminal 104 notifies the server 102 and, at the same time, displays a purchase page 700, such as illustrated in FIG. 7, of the link destination embedded in the purchase link button selected by the user. A configuration is possible in which, at this time, the purchase page 700 of the link destination is displayed and, at the same time, the video being played (for example, the video A) is displayed in a small manner in the lower portion of the screen or the like. Note that the server 102 may be configured to perform the displaying of the purchase page 700 and the small displaying in the lower portion or the like of the video being played. In such a case, the viewer terminal 104 sends, to the server 102, a request specifying that one of the purchase link buttons 801 to 805 has been selected, and receives and displays a response screen from the server 102. Thereafter, the processing of step S301 illustrated in FIG. 4 is executed.

A configuration is possible in which, when, for example, the user that is a viewer inputs a comment in the comment input field 810 illustrated in the example of FIG. 2, the viewer terminal 104 sends the inputted comment to the server 102 in step S307 of FIG. 4. As illustrated in the example of FIG. 2, comments CM1 and CM2 sent to the server 102 are embedded in the video A by the server 102. The viewer terminal 104 may be configured to receive the video A in which the comments CM1 and CM2 are embedded from the server 102 and display this video A. Thereafter, the processing of step S301 illustrated in FIG. 4 is executed.

A configuration is possible in which, when, for example, the user that is a viewer selects the good evaluation button 821 or the poor evaluation button 822, the viewer terminal 104 sends, to the server 102 in step S307 of FIG. 4, a notification in which the evaluation expressed by the selected button is specified. The evaluations sent to the server 102 are aggregated in the server 102, and can be used for confirmation by the manager or the administrator of the video distribution site. Additionally, the evaluations aggregated in the server 102 can be sent from the server 102 to the streamer terminal 103, and can be used by the user that is a streamer to confirm the evaluations of the video that the streamer distributed. Thereafter, the processing of step S301 is executed.

A configuration is possible in which, when, for example, the user that is a viewer performs an operation to end the playing of the video, the viewer terminal 104 sends, to the server 102 in step S307, a request in which ending of the video is specified. Thereafter, the server 102 ends the video. Then, the processing of the viewer terminal 104 may be ended (not illustrated in the drawings).

Figure 8:
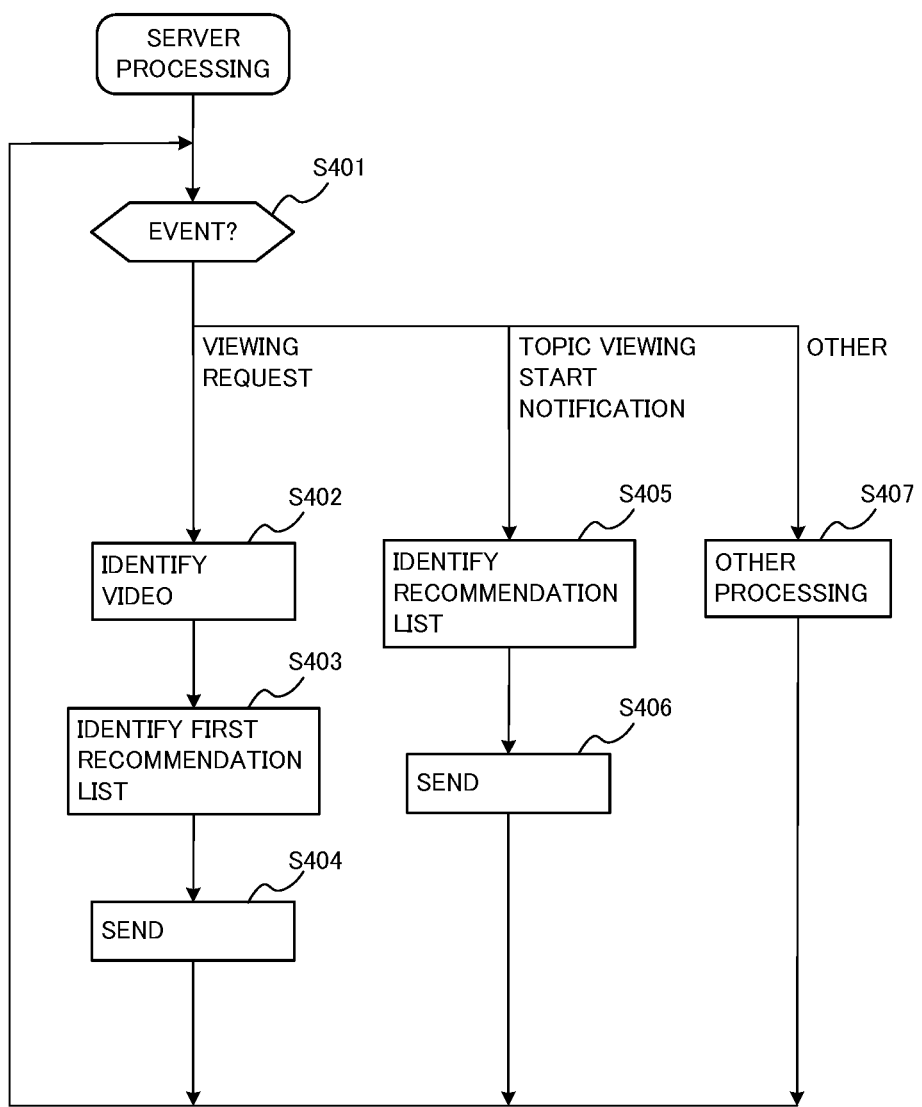
FIG. 8 is a flowchart illustrating the flow of control of server processing executed by the server of the distribution management system, in Embodiment 1.

FIG. 8 is a flowchart explaining the flow of server processing executed by the server 102 in the present embodiment. In FIG. 8, the server 102 starts the server processing when the power supply of the server 102 starts up, for example. When the server processing starts, the server 102 assumes a stand-by state until an event occurs (step S401).

Firstly, when the server 102 receives a viewing request from the viewer terminal 104, the server 102 identifies the video specified in the received viewing request (step S402). A configuration is possible in which, at this time, the server 102 also identifies a topic list TL in which topics included in that video and frames that the topics occupy are associated. For example, as illustrated in FIG. 5, a product that is a topic and frames by time display that are the frames that the presentation of that product occupies are associated in the topic list TL. This topic list TL may include an introduction prior to the streamer beginning the presentation of the product, and a break between the presentation of one product and the presentation of the next product.

Note that the divisions between topics of the topic list TL may, when live streaming, be entered by a method in which the streamer presses a predetermined button during distribution, or may, when VOD distributing, be entered by the manager, the administrator, or the like of the video distribution site.

A configuration is possible in which, when a video start position is specified in the received viewing request, in step S402, the server 102 specifies the identified video start position of the video at the specified video start position.

Returning to FIG. 8, next, the server 102 identifies the first recommendation list (step S403). Then, the server 102 sends the identified video, the topic list, and the first recommendation list to the viewer terminal 104 (step S404). Thereafter, the processing of step S401 is executed.

Next, when the server 102 receives a viewing start notification of a new topic from the viewer terminal 104, the server 102 identifies a new recommendation list corresponding to that topic (step S405).

A recommendation video, the video start position thereof, and a thumbnail image may be associated in the recommendation list. FIG. 6 is an explanatory drawing illustrating the recommendation list L1 that is an example of the received recommendation list. The video start position of the recommendation video is the first frame of the frames in which the topic, related to the topic currently being played in the viewer terminal 104, is covered. For example, in terms of the example illustrated in FIG. 2, the product currently being played in the video A is the product "crystal mask" and, as such, the first frame is a frame (12:34) at which the same product "crystal mask" starts in the recommendation video X1, a frame (08:05) at which the same product "KN95 mask" starts in the recommendation video Y1, and a frame (04:46) at which the similar product "non-woven mask" starts in the recommendation video Z1. Additionally, the video start position may be a frame of a break immediately prior to the start of that topic.

Thus, by specifying the video start position of the recommendation video, the user that is a viewer can, when the recommendation video is selected, view from the frame covering the topic related to the topic current being viewed, and can easily and quickly obtain information.

The divisions between the topics of the topic list TL may be used as the video start positions. Additionally, the video start positions may, when live streaming, be entered by a method in which the streamer presses a predetermined button during distribution, or may, when VOD distributing, be entered by the manager, the administrator, or the like of the video distribution site.

Note that, since there are not any video start positions of the recommendation videos included in the first recommendation list for any of the topics in the video being played on the viewer terminal 104, and there are no related topics, these video start positions may be first frames of each of the recommendation videos.

The thumbnail image associated with the recommendation video is, in the recommendation video, a representative frame of a portion of the video in which a topic, related to the topic determined as being current played, is covered. Specifically, as with the video A, each of the recommendation videos X1, Y1, Z1, . . . can include a plurality of topics, and the representative frames of the portions of the video in which topics related to the topic currently being played in the video A are covered serve as the thumbnail images. As illustrated in the example of the screen illustrated in FIG. 2, the thumbnail images are displayed as images that represent the recommendation videos X1, Y1, and Z1 that are displayed in the recommended videos.

In FIG. 2, the topic being played in the current video A is the product "crystal mask" and, as such, the thumbnail images of the recommendation videos X1, Y1, Z1 are, respectively, representative frames from among the topics that cover the same product "crystal mask", the same product "KN95 mask", and the similar product "non-woven mask."

For example, in the recommendation videos X1, Y1, Z1, . . . , the thumbnail images may be first frames, or may be central frames, of portions of the videos in which topics, related to the topic being played in the current video A, are covered. In the example of FIG. 6, the thumbnail images are central frames. The thumbnail frames may be set to the most exciting times in the recommendation videos X1, Y1, Z1 . . . . Here, the term "exciting" may be understood to mean that the streamer or the like sets a "time at which the streamer is in a fixed pose" or, in the case of live streaming, may be understood to mean the frame at which a measured number of purchases per unit time is the greatest. The central frames are an example of the "exciting times."

Thus, by setting the thumbnail frames to the first frame or the central frame of the topics, the possibility of images that appropriately express that topic being displayed increases.

The thumbnail images may be frames from a point in time at which actions from users that are viewers are most concentrated. Examples of the actions include selections of the purchase link buttons 801 to 805 such as illustrated in FIG. 2, inputs into the comment input field 810, selection of the good evaluation button 821 or the poor evaluation button 822, and the like. When the purchase link buttons 801 to 805 are selected, the action may be counted only when payment is actually rendered and the product is purchased.

Thus, by using, as the thumbnail images, the frames from the points in time at which the actions from the users that are viewers are most concentrated, it is possible to display, in the recommendation videos, thumbnail images that leave the strongest impression of that topic. Additionally, by using, as the thumbnail images, the frames from the point in time at which the users actually render payment, it is possible to enhance promotional effects of the product or the like that the user is viewing.

When the recommendation video X1, Y1, Z1 . . . itself is the video currently being live streamed, a representative frame up to the frame being live streamed may be used as the thumbnail image. That is, a configuration is possible in which the video currently being live streamed is sequentially recorded and becomes a recommendation video candidate, and a representative frame up to the frames that have been live streamed and recorded may be used as the thumbnail image in the recommendation list L1.

In the case of live streaming as well, the representative frame may be the first frame of the portion in which the topic currently being played in the video A is covered, may be a central frame, or may be a frame from the point in time at which the actions from the users are most concentrated.

Thus, by setting the video that is being live streamed as a recommendation list candidate, the user that is a viewer can obtain newer information related to the topic currently being viewed. Additionally, by identifying the thumbnail image from the frames that have been live streamed and sequentially recorded, it is possible to use a representative thumbnail image in real time for the video currently being live streamed as well.

Note that, since there are not thumbnail images associated with the recommendation videos in the first recommendation list for any of the topics in the video being played on the viewer terminal 104, and there are no related topics, these thumbnail images may be representative frames of each of the recommendation videos.

Returning to FIG. 8, next, the server 102 sends the identified recommendation list to the viewer terminal 104 (step S406). Then, the processing of step S401 is executed.

Next, when another event occurs, the server 102 executes other processing corresponding to the event that has occurred (step S407). For example, when the server 102 receives, from the viewer terminal 104, a notification or the like of an action being performed in step S307 illustrated in FIG. 4, the server 102 executes processing corresponding to the received notification or the like. Thereafter, the processing of step S401 is executed.

According to Embodiment 1 described above, recommendation videos are displayed that cover products or the like (a product or the like that is the same or another product or the like that is similar) related to the product or the like (the topic) currently being played on the viewer terminal 104. As a result, the user that is a viewer can, when considering whether to purchase a product or the like, easily and quickly obtain information such as reviews or the like and other videos related to that product or the like. Moreover, the user that is a viewer can easily and quickly perform a comparison with other similar products or the like when considering whether to purchase that product or the like.

Additionally, according to Embodiment 1, every time the topic currently being played changes, the viewer terminal 104 receives, from the server 102, a recommendation list related to that topic. The viewer terminal 104 need not retain all of the recommendation lists, and need not identify the recommendation lists, which makes it possible to reduce memory usage and CPU usage.

Embodiment 2

Hereinafter, Embodiment 2 of the present disclosure is described. In Embodiment 2, descriptions of configurations and processes that are the same as described in Embodiment 1 are appropriately forgone.

Sending/Receiving of Data Between Server and Viewer Terminal

Figure 9:
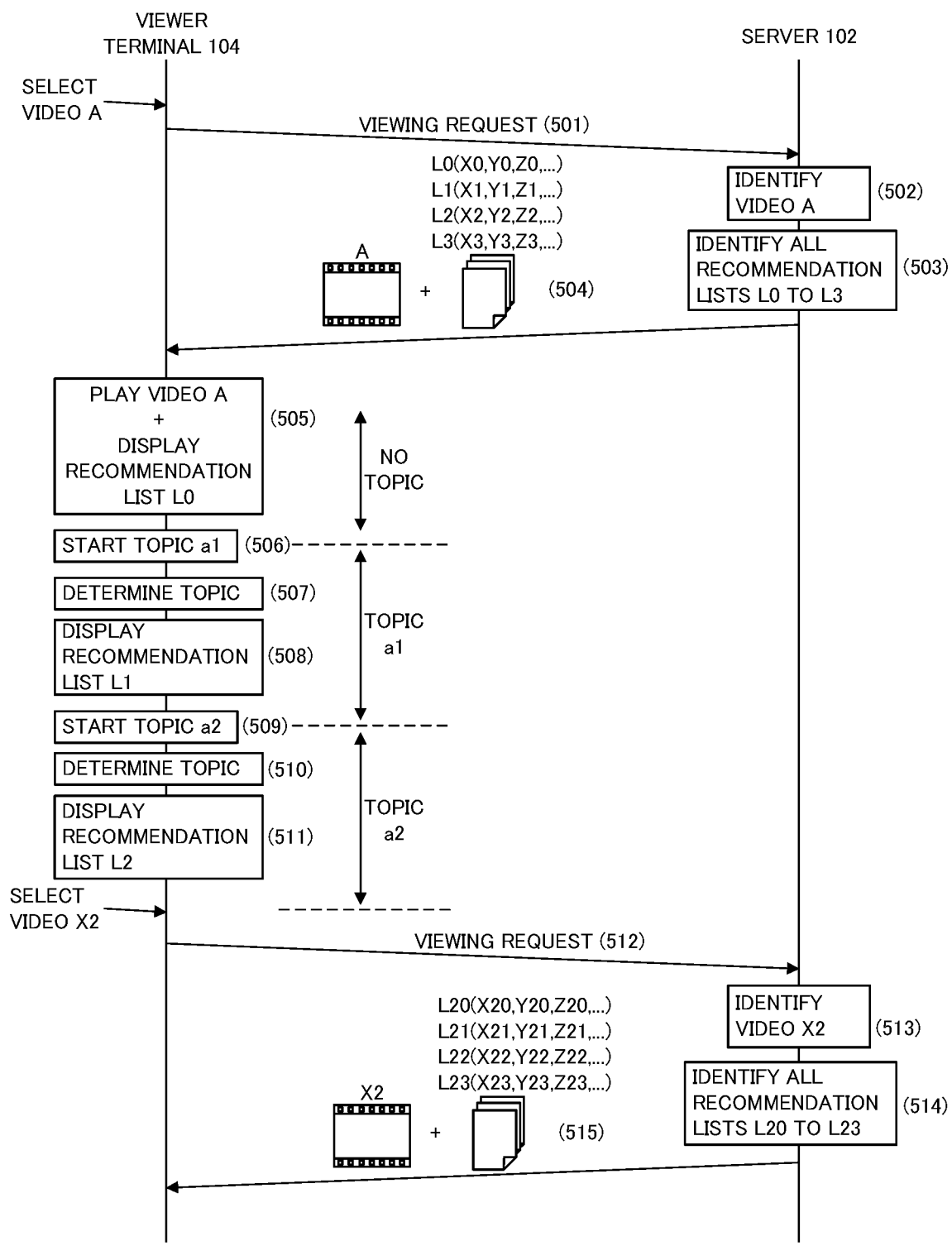
FIG. 9 is a session diagram illustrating an exchange between a server and a viewer terminal of a distribution management system, in Embodiment 2.

FIG. 9 is a session diagram illustrating an exchange in the distribution management system 101 that is carried out when the viewer selects and changes the video to be viewed. In the following, the exchange that is carried out when the viewer selects and changes the video to be viewed is described while referencing FIG. 9. In Embodiment 2, when the video A is selected once on the viewer terminal 104, the server 102 identifies recommendation lists Ln related to all of the topics an covered in the video A, and provides a bundle of the identified recommendation lists Ln to the viewer terminal 104. The viewer terminal 104 changes, on the basis of the provided bundle of recommendation lists Ln, the recommendation list Ln every time the topic an changes.

Firstly, when the video A is selected on the viewer terminal 104, the viewer terminal 104 sends, to the server, a viewing request in which the video A is specified (501).

When the server 102 receives the viewing request from the viewer terminal 104, the server 102 identifies the video A (502). Then, the server 102 identifies all of the recommendation lists L0 to L3 (503).

When the server 102 identifies the video A and all of the recommendation lists L0 to L3, the server 102 sends the identified video A and the recommendation lists L0 to L3 to the viewer terminal 104 (504).

When the viewer terminal 104 receives the video A and all of the recommendation lists L0 to L3 from the server 102, the viewer terminal 104 plays the video A and displays the first recommendation list L0 (505).

When the frames of the video A advance and the topic a1 starts (506), the viewer terminal 104 determines, in a determination of the topic currently being played, that the topic a1 has been switched to (507). Then, the viewer terminal 104 displays the recommendation list L1 related to the determined topic a1 (508).

When the frames of the video A advance and the topic a2 starts (509), the viewer terminal 104 determines the topic in the same manner (510) and displays the recommendation list L2 (511).

Here, when the recommendation video X2 included in the recommendation list L2 is selected on the viewer terminal 104 while the video A is being played, the viewer terminal 104 sends, to the server 102, a viewing request in which the recommendation video X2 is specified (512).

Then, the server 102 identifies the recommendation video X2 in the same manner (513), identifies all of the recommendation lists L20 to L23 (514), and sends the recommendation lists L20 to L23 to the viewer terminal 104 (515).

Terminal Processing and Server Processing

Figure 10:
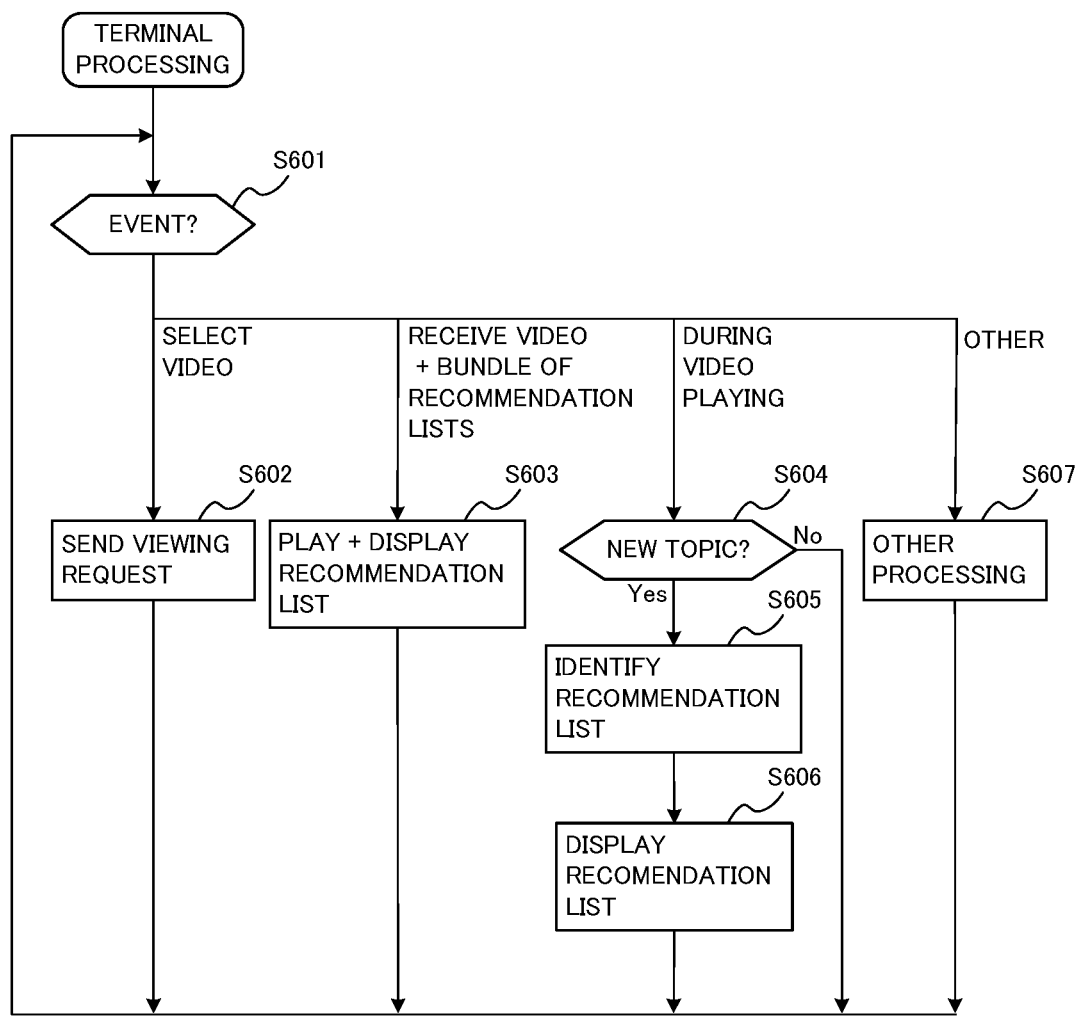
FIG. 10 is a flowchart illustrating the flow of control of terminal processing executed by the viewer terminal of the distribution management system, in Embodiment 2.

FIG. 10 is a flowchart explaining the flow of terminal processing executed in the viewer terminal 104 in the present embodiment. Hereinafter, the terminal processing is described while referencing FIG. 10.

In one example, the viewer terminal 104 starts the terminal processing when a video app for live streaming commerce such as illustrated in FIG. 2 is started up or a video site is accessed.

In FIG. 10, when the terminal processing starts, the viewer terminal 104 assumes a stand-by state until an event occurs (step S601).

Firstly, when the viewer terminal 104 receives a selection operation of a video from the user, the viewer terminal 104 sends, to the server 102, a viewing request in which the video is specified (step S602). Thereafter, the processing of step S601 is executed.

Next, when the viewer terminal 104 receives, from the server 102, the video specified in the viewing request and the bundle of recommendation lists of that video, playing of the received video is started and the first recommendation list of the bundle of the recommendation lists is displayed (step S603). At this time, the viewer terminal 104 may be configured to identify information needed to stream/play the video.

A configuration is possible in which, when the viewer terminal 104 receives the video and the bundle of recommendation lists from the server 102, a topic list TL' that is described later is also received. As illustrated in FIG. 11, topics included in the video, the frames that the topics occupy, and the recommendation lists corresponding to the topics are associated in the topic list TL'. Thereafter, the processing of step S601 is executed.

Next, when the viewer terminal 104 determines that the video is playing, the viewer terminal 104 determines whether that video has switched to a new topic (step S604).

When the viewer terminal 104 determines that the video has switched to a new topic (step S604; Yes), the viewer terminal 104 references the topic list TL' to identify, on the basis of the current play position, the recommendation list corresponding to the new topic (step S605).

Then, the viewer terminal 104 displays the identified recommendation list in the recommended videos (in step S606). As illustrated in the example of the topic list TL' of FIG. 11, the viewer terminal 104 may be configured to display the recommendation list L0 during introductions and breaks in which there is not a topic. Thereafter, the processing of step S601 is executed.

Meanwhile, when the viewer terminal 104 determines that the video has not switched to a new topic (step S604; No), the processing of step S601 is executed without modification.

Then, when another event occurs, the viewer terminal 104 executes other processing corresponding to the event that has occurred (step S607). Thereafter, the processing of step S601 is executed.

Figure 12:
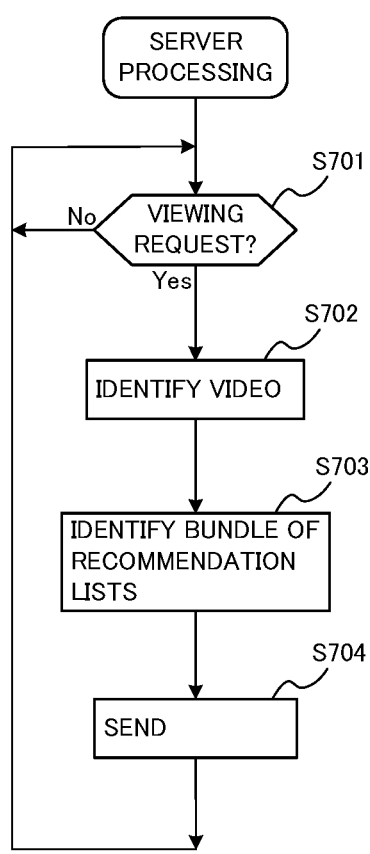
FIG. 12 is a flowchart illustrating the flow of control of server processing executed by the server of the distribution management system, in Embodiment 2.

FIG. 12 is a flowchart explaining the flow of server processing executed by the server 102 in the present embodiment. In FIG. 12, the server 102 starts the server processing when the power supply of the server 102 starts up, for example. When the server processing starts, the server 102 assumes a stand-by state until a viewing request is received from the viewer terminal 104 (step S701; No).

When the server 102 receives a viewing request from the viewer terminal 104 (step S701; Yes), firstly, the server 102 identifies the video specified in the received viewing request (step S702). At this time, the server 102 identifies the topic included in that video and also the frames that the topic occupies.

Then, the server 102 identifies the recommendation list corresponding to the each of all of the topics included in the identified video, that is, the server 102 identifies the bundle of recommendation lists (step S703). At this time, the server 102 also identifies the topic list TL' such as illustrated in the example of FIG. 11. For example, a product that is a topic, frames by time display that are frames that the presentation of that product occupies, and the recommendation list corresponding to that product are associated in the topic list TL'. This topic list TL' may include introductions and breaks.

Then, the server 102 sends the identified video, the bundle of recommendation lists, and the topic list TL' to the viewer terminal 104 (step S704). Thereafter, the processing of step S701 is executed.

As described above, according to Embodiment 2, when sending a selected video to the viewer terminal 104, the server 102 sends all of the recommendation lists related to that video. As a result, communication, between the server 102 and the viewer terminal 104 related to the displaying of the recommendation list during playing of the video, is eliminated and, as such, the communication load can be reduced.

Appendices

[1]
A distribution management system comprising:
one or more processors, wherein
processing for
    playing, on a screen, a video in which a plurality of topics is sequentially covered,
    determining a topic currently being covered on the screen on which the video is being played,
    identifying a list of recommendation videos in which a topic related to the determined topic is covered, and
    providing the identified list via the screen
is executed by at least one of the one or more processors.

[2]
The distribution management system according to 1, wherein the distribution management system plays the video on a terminal having or including the screen, acquires, from the terminal, a frame of a video currently being played on the screen to determine a topic covered in the frame, and provides the list to the terminal.

[3]
The distribution management system according to [1] or [2], wherein the terminal having the screen transmits the determined topic to a server and acquires the list from the server to identify the list.

[4]
The distribution management system according to [1], wherein, when starting playing of the video, the terminal having the screen acquires a plurality of lists from a server and, of the plurality of lists, sets a list in which the determined topic is covered as the list to be identified.

[5]
The distribution management system according to any one of [1] to [4], wherein, when any of the recommendation videos is selected from the provided list, the selected recommendation video is played on the screen from a frame in which a topic related to the determined topic is covered.

[6]
The distribution management system according to any one of [1] to [5], wherein the list provided via the screen includes a thumbnail image of the identified recommendation video, the thumbnail image being based on the frame in which the topic related to the determined topic is covered.

[7]
The distribution management system according to [6], wherein the thumbnail image is a representative frame, of a portion of the video in which the topic related to the determined topic is covered, in the recommendation video.

[8]
The distribution management system according to [7], wherein the representative frame is a first frame or a central frame of the portion of the video in which the topic is covered in the recommendation video.

[9]
The distribution management system according to [7] or [8], wherein
    processing for receiving actions from viewers is executed, and
    the representative frame is a frame, in the portion of the video in which the topic is covered in the recommendation video, from a point in time at which the actions from the viewers are most concentrated.

[10]
The distribution management system according to [6], wherein
    processing for sequentially recording a video being live streamed is executed, during the live streaming, the sequentially recorded video is set as a candidate for the recommendation videos included in the list, and
    a representative frame of frames that are live streamed and sequentially recorded is set as the thumbnail image of the list.

[11]
The distribution management system according to [10], wherein the representative frame is a first frame or a central frame of the portion of the video in which the topic is covered in the recommendation video, and is a first frame or a central frame of frames that have been live streamed and sequentially recorded.

[12]
The distribution management system according to [10] or [11], wherein
    processing for receiving actions from viewers is executed, and
    the representative frame is a frame from the portion of the video in which the topic is covered in the recommendation video, and is a frame, of frames that have been live streamed and sequentially recorded, from a point in time at which the actions from the viewers are most concentrated.

[13]

The distribution management system according to [9] or [12], wherein
the topic is about goods and services to be presented and sold in live streaming commerce, and
the action is a purchase of the goods and services by the viewer.

[14]

A distribution management method, comprising:
playing, by a computer and on a screen, a video in which a plurality of topics is sequentially covered;
determining, by the computer, a topic currently being covered on the screen on which the video is being played;
identifying, by the computer, a list of recommendation videos in which a topic related to the determined topic is covered; and
providing, by the computer, the identified list via the screen.

[15]

A non-transitory computer-readable medium storing a program for causing a computer to execute:
playing, on a screen, a video in which a plurality of topics is sequentially covered;
determining a topic currently being covered on the screen on which the video is being played;
identifying a list of recommendation videos in which a topic related to the determined topic is covered; and
providing the identified list via the screen.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be advantageously used in distribution management whereby a viewer can easily and quickly obtain desired information.

REFERENCE SIGNS LIST

101 Distribution management system
102 Server
103 Streamer terminal
104 Viewer terminal
105 Computer communication network
700 Purchase page
801, 802, 803, 804, 805 Purchase link button
810 Comment input field
821 Good evaluation button
822 Poor evaluation button
A Video
a1, a2 Topic, product or the like
CM1, CM2 Comment
L0, L1, L2, L3, L4, L5, L20, L21, L22, L23 Recommendation list
TL, TL' Topic list
X0, Y0, Z0, X1, Y1, Z1, X2, Y2, Z2, X3, Y3, Z3, X20, Y20, Z20, X21, Y21, Z21, X22, Y22, Z22, X23, Y23, Z23 Recommendation video

The invention claimed is:

1. A distribution management system comprising:
a memory storing one or more instructions;
at least one processor operatively coupled to the memory,
one or more processors operatively coupled to the memory and configured to execute the one or more instructions stored in the memory,
wherein the one or more instructions, when executed by the one or more processors, cause the distribution management system to:
play, on a screen, a video which covers a plurality of topics sequentially,
acquire a recommendation list that specifies recommended videos, wherein each of the recommended videos covers one or more topics,
determine a topic currently being covered on the screen on which the video is being played based on a topic list that specifies time intervals of the video during which the plurality of topics are covered, respectively,
identify, from among the recommended videos specified in the acquired recommendation list, videos covering the determined topic, and generate a relation list that specifies the identified videos, and
provide, with the video, the generated relation list on the screen.

2. The distribution management system according to claim 1, wherein the one or more instructions, when executed by the one or more processors, cause the distribution management system to:
play the video on a terminal including the screen,
acquire, from the terminal, a frame of a video currently being played on the screen to determine a topic covered in the frame, and
provide the identified list to the terminal.

3. The distribution management system according to claim 2, wherein the terminal including the screen transmits the determined topic to the server and acquires the identified list from the server.

4. The distribution management system according to claim 1, wherein, after starting playing of the video, the recommendation list is acquired.

5. The distribution management system according to claim 1, wherein, after any one of the recommendation videos is selected from the provided identified list, the selected recommendation video is played on the screen from a frame in which a topic related to the determined topic is covered.

6. The distribution management system according to claim 5, wherein the identified list provided via the screen includes a thumbnail image of the selected recommendation video, the thumbnail image being based on the frame in which the topic related to the determined topic is covered.

7. The distribution management system according to claim 6, wherein the thumbnail image is a representative frame, of a portion of the video in which the topic related to the determined topic is covered, in the selected recommendation video.

8. The distribution management system according to claim 7, wherein the representative frame is a leading frame or a central frame of the portion of the video in which the topic is covered in the selected recommendation video.

9. The distribution management system according to claim 7, wherein the one or more instructions, when executed by the one or more processors, cause the distribution management system to:
perform processing for receiving actions from viewers is executed, and
wherein the representative frame is a frame, in the portion of the video in which the topic is covered in the selected recommendation video, from a point in time at which the actions from the viewers are most concentrated.

10. The distribution management system according to claim 9, wherein
the topic is about goods or services to be presented and sold in live streaming commerce, and
the action is a purchase of the goods or services by the viewer.

11. The distribution management system according to claim 6, wherein the one or more instructions, when executed by the one or more processors, cause the distribution management system to:
perform processing for sequentially recording a video being live streamed is executed,
wherein during the live streaming, the sequentially recorded video is set as a candidate for the recommendation videos included in the identified list, and
wherein a representative frame of frames that are live streamed and sequentially recorded is set as the thumbnail image of the identified list.

12. The distribution management system according to claim 11, wherein the representative frame is a first frame or a central frame of a portion of the video in which the topic is covered in the selected recommendation video, and is a first frame or a central frame of frames that have been live streamed and sequentially recorded.

13. The distribution management system according to claim 11, wherein the one or more instructions, when executed by the one or more processors, cause the distribution management system to:
perform processing for receiving actions from viewers is executed, and
wherein the representative frame is a frame from a portion of the video in which the topic is covered in the selected recommendation video, and is a frame, of frames that have been live streamed and sequentially recorded, from a point in time at which the actions from the viewers are most concentrated.

14. The distribution management system according to claim 1, wherein
the video is played on the screen of a terminal,
the recommendation list is acquired by a server,
the terminal reports, to the server, a frame of the video being played on the screen,
the topic is determined by the server based on the reported frame,
the identified videos are identified by the server,
the relation list is generated by the server, and
the server provides the relation list to the terminal.

15. A distribution management method, comprising:
playing, by a computer and on a screen, a video which covers a plurality of topics sequentially;
acquiring a recommendation list that specifies recommended videos, wherein each of the recommended videos covers one or more topics;
determining, by the computer, a topic currently being covered on the screen on which the video is being played based on a topic list that specifies time intervals of the video during which the plurality of topics are covered, respectively;
identifying, by the computer, from among the recommended videos specified in the acquired recommendation list, videos covering the determined topic, and generating a relation list that specifies the identified videos; and
providing, by the computer, with the video, the generated relation list on the screen.

16. A non-transitory computer-readable medium storing a program for causing a computer to execute:
playing, on a screen, a video which covers a plurality of topics sequentially;
acquiring a recommendation list that specifies recommended videos, wherein each of the recommended videos covers one or more topics,
determining a topic currently being covered on the screen on which the video is being played based on a topic list that specifies time intervals of the video during which the plurality of topics are covered, respectively;
identifying, from among the recommended videos specified in the acquired recommendation list, videos covering the determined topic, and generating a relation list that specifies the identified videos; and
providing, with the video, the generated relation list on the screen.

* * * * *